United States Patent
Ramanujan

(10) Patent No.: US 9,602,485 B2
(45) Date of Patent: Mar. 21, 2017

(54) NETWORK, NETWORK NODE WITH PRIVACY PRESERVING SOURCE ATTRIBUTION AND ADMISSION CONTROL AND DEVICE IMPLEMENTED METHOD THERFOR

(71) Applicant: ARCHITECTURE TECHNOLOGY, INC., Eden Prairie, MN (US)

(72) Inventor: Ranga Sri Ramanujan, Medina, MN (US)

(73) Assignee: ARCHITECTURE TECHNOLOGY, INC., Eden Prairie, MN (US)

(*) Notice: Subject to any disclaimer, the term of this patent is extended or adjusted under 35 U.S.C. 154(b) by 46 days.

(21) Appl. No.: 14/470,671

(22) Filed: Aug. 27, 2014

(65) Prior Publication Data

US 2014/0372749 A1    Dec. 18, 2014

Related U.S. Application Data

(62) Division of application No. 13/427,233, filed on Mar. 22, 2012, now Pat. No. 8,862,871.

(60) Provisional application No. 61/476,082, filed on Apr. 15, 2011.

(51) Int. Cl.

| H04L 29/06 | (2006.01) |
|---|---|
| H04L 9/08 | (2006.01) |
| H04L 9/32 | (2006.01) |
| H04L 9/30 | (2006.01) |
| H04L 12/54 | (2013.01) |

(52) U.S. Cl.
CPC ............ *H04L 63/08* (2013.01); *H04L 9/0847* (2013.01); *H04L 9/32* (2013.01); *H04L 9/3213* (2013.01); *H04L 63/0807* (2013.01); *H04L 63/12* (2013.01); *H04L 9/3073* (2013.01); *H04L 12/5695* (2013.01)

(58) Field of Classification Search
CPC .......................... H04L 12/5695; H04L 47/24
USPC ........................................................ 713/155
See application file for complete search history.

(56) References Cited

U.S. PATENT DOCUMENTS

| 5,050,162 | A  | * | 9/1991 | Golestani ...................... 370/235 |
| 6,496,867 | B1 | * | 12/2002 | Beser .................. H04L 12/4633 709/225 |
| 6,502,135 | B1 |   | 12/2002 | Munger et al. |
| 6,678,828 | B1 | * | 1/2004 | Pham et al. ...................... 726/2 |
| 6,839,759 | B2 |   | 1/2005 | Larson et al. |
| 7,043,545 | B2 |   | 5/2006 | Tabbara et al. |
| 7,188,180 | B2 |   | 3/2007 | Larson et al. |
| 7,302,704 | B1 |   | 11/2007 | Elliott |
| 7,401,217 | B2 |   | 7/2008 | Huang et al. |
| 7,418,504 | B2 |   | 8/2008 | Larson et al. |
| 7,490,151 | B2 |   | 2/2009 | Munger et al. |
| 7,523,314 | B2 |   | 4/2009 | Spies et al. |
| 7,719,972 | B2 | * | 5/2010 | Yuan .................. H04L 12/5695 370/230 |

(Continued)

*Primary Examiner* — Hadi Armouche
*Assistant Examiner* — Bryan Wright
(74) *Attorney, Agent, or Firm* — Pederson IP, LLC

(57) ABSTRACT

A device implemented, carrier independent packet delivery universal addressing networking protocol for communication over a network between network nodes utilizing a packet. The protocol has an IP stack having layers. At least some of the layers have privacy preserving source node attribution and network admission control. The packet is admitted to the network only if a source node of the network nodes admits the packet.

21 Claims, 9 Drawing Sheets

(56) References Cited

U.S. PATENT DOCUMENTS

| | | |
|---|---|---|
| 8,208,470 B2 | 6/2012 | Gulati et al. |
| 8,483,123 B2 * | 7/2013 | Zheng ................ H04L 12/5695 |
| | | 370/252 |
| 8,694,771 B2 | 4/2014 | Malek |
| 2001/0047423 A1 | 11/2001 | Shao et al. |
| 2004/0025018 A1 * | 2/2004 | Haas et al. .................... 713/168 |
| 2006/0034179 A1 * | 2/2006 | Carter et al. ................. 370/241 |
| 2006/0130126 A1 | 6/2006 | Touve et al. |
| 2008/0144641 A1 | 6/2008 | Le Roux et al. |
| 2009/0248680 A1 * | 10/2009 | Kalavade ........... G06Q 30/0267 |
| 2009/0327714 A1 * | 12/2009 | Yaghmour .................... 713/168 |
| 2010/0014422 A1 * | 1/2010 | Lee ......................... H04L 47/14 |
| | | 370/230 |

* cited by examiner

NETWORK, NETWORK NODE WITH PRIVACY PRESERVING SOURCE ATTRIBUTION AND ADMISSION CONTROL AND DEVICE IMPLEMENTED METHOD THERFOR

RELATED APPLICATIONS

This application is a division of and claims priority to U.S. patent application Ser. No. 13/427,233, filed Mar. 12, 2012, entitled "NETWORK WITH PROTOCOL, PRIVACY PRESERVING SOURCE ATTRIBUTION AND ADMISSION CONTROL AND METHOD", which claims priority to U.S. Provisional Application No. 61/476,082, filed Apr. 15, 2011, entitled "NETWORK WITH PROTOCOL, PRIVACY PRESERVING SOURCE ATTRIBUTION AND ADMISSION CONTROL AND METHOD".

FIELD

This application relates generally to computer networks and, more particularly, network having a communication protocol and which may have privacy preserving source attribution and/or admission control and related methods.

BACKGROUND

Internet Protocol, or IP, is utilized to transmit packets of information over computer networks and forms the protocol backbone of the Internet. The Internet is commonly known as the networked communication system interconnecting various sub-networks throughout the world. Various users of the term "Internet" may utilize the term interchangeably or in substitution for other terms such as "internet" and "World Wide Web". It is to be recognized and understood, however, that the Internet may refer to other internetworking systems and protocols for linking nodes, either public or private, existing or yet to be developed. Internet Protocol defines how various nodes on the network are addressed and grouped together and how packets are labeled to route the packets from the source node in the network to the destination node. Thus, Internet Protocol provides labeling and routing for effectively all data transmitted over the Internet.

In general, the Internet starts with what is commonly referred to as the physical layer, comprised of the actual hardware which comprises the Internet, from individual routers to the data transmission lines over which data is transmitted. The media access control layer, or MAC layer, is an interface between the physical layer of the Internet and sub-networks such as local area networks and so forth which allow individual nodes to communicate directly with one another without respect to the Internet. The media access control layer functions by providing one unique address or serial number to each device in a sub-network, thereby allowing the members of a sub-network to communicate across local repeaters and hubs but not over the Internet.

The Internet Protocol then interworks between the sub-networks over the Internet. The Internet Protocol creates a system which is relatively fast and simple. Any packet which is sent onto the Internet with an appropriate header will be guided through the various nodes of the Internet. Because the Internet Protocol does not necessarily seek to ensure that all data reaches its destination, with corrupted packets simply being deemed lost, not all packets will reach the destination. However, the Internet Protocol does ensure that an attempt will be made to transmit every data packet placed on the Internet to the node included in the destination field of the packet's header information, and generally the overwhelming majority of data packets placed on the Internet do, in fact, reach their destination.

SUMMARY

This quality, however, introduces vulnerabilities in the Internet which may be, and in fact routinely are, exploited. A user can overwhelm the physical layer of the Internet, and in particular the physical layer of a particular destination node, by streaming packets addressed to the destination node onto the Internet. Because the Internet Protocol does not discriminate against packets, the tendency of the structure of the Internet is simply to transmit all packets to their destination, making it relatively easy for a malicious user to attack a particular destination node by flooding the node with packets of data.

Security protocols have been developed which seek to identify such attacks at various nodes on the Internet. However, such security protocols have existed, not on the Internet layer or transport layer of the Internet, but rather on top of such layers. Thus, the Internet Protocol will continue to transmit any packet it finds until an outside utility instructs the Internet Protocol not to do so. This reality means that packets may still be flooded into the Internet, but that the packets may not reach their destination. However, such an attack may still be damaging to the Internet as a whole, as packets nevertheless are moving about the Internet and consuming resources.

Ultimately, a weakness in the Internet Protocol arises because, while the Internet Protocol's inability to block packets may be compensated for with additional protocols, nothing in the Internet Protocol exists to reduce the ability to place malicious packets on the Internet in the first place. As such, any attack which is launched may succeed in causing at least some disruption to the Internet as a whole by causing every packet which is put onto the Internet to travel at least some distance before being blocked. Because all data is automatically transmitted at least some distance, the Internet as a whole may be vulnerable to malicious acts.

A new Internet Protocol has been developed which seeks to block attacks which may degrade or otherwise reduce the effectiveness of the Internet by preventing malicious packets from being placed onto the Internet in the first instance. Networking devices which are configured to follow the new protocol, or assured internetworking protocol, may incorporate a secure and verifiable network identification, as well as a network admission control system which may assess packets to be placed on the Internet. If the packets are deemed not proper for transmission, the networking device itself will reject the packet before the packet is placed on the Internet in the first place. Networking devices which are not configured for the assured internetworking protocol, and do not include a secure identification, may not interface with the internetworking system at all. Thus, only devices which incorporate network admission control may interface with the network in the first place. Devices which launch Internet attacks may have their access to the Internet withdrawn, preemptively stopping any attack by prohibiting access to the Internet in the first place. The implementation of a signaling protocol within the network layer is a significant departure from the Internet architecture where signaling is implemented over the IP layer.

In an embodiment, a device implemented, carrier independent packet delivery universal addressing networking protocol for communication over a network between a plurality of network nodes utilizing a packet comprises an IP stack having a plurality of layers. The at least some of the plurality of layers comprise privacy preserving source node attribution and network admission control with the packet being admitted to the network only if a source node of the plurality of network nodes admits the packet.

In an embodiment, the source node has an identification address, wherein a destination node has an identification address and wherein the packet carries both the identification address of the source node and the identification address of the destination node.

In an embodiment, the identification address of the source node is established by a trusted entity.

In an embodiment, the networking protocol further comprises a database of trusted identification addresses maintained by the trusted entity and wherein the destination node relies on the database and the identification address of the source node on admission of the packet to the network.

In an embodiment, network node configured for communication over a network utilizing a packet from a source node to a destination node, comprises a protocol control having a device implemented, carrier independent packet delivery universal addressing networking protocol having an IP stack. The IP stack comprises privacy preserving source node attribution running on the IP stack configured to communicate to the destination node and network admission control with the packet configured to be admitted to the network only if the source node of the packet allows admission.

In an embodiment, a protocol stack of a device implemented, carrier independent packet delivery universal addressing networking protocol for communication over a network between network nodes utilizing a packet, comprises privacy preserving source node attribution and network admission control with the packet being admitted to the network only if a source node of the network nodes admits the packet.

In an embodiment, a method for communicating over a network between a plurality of network nodes using a device implemented, carrier independent packet delivery universal addressing network protocol having an IP stack having a plurality of layers, at least some of the plurality of layers comprising a privacy preserving source node attribution and a network admission control, comprises the steps of preserving a privacy of the source node using the privacy preserving source node attribution and admitting a packet onto the network only if the source node admits the packet.

In an embodiment, the source node has an identification address, wherein a destination node has an identification address, and the method further comprises the step of incorporating both the identification address of the source node and the identification address of the destination node into the packet.

In an embodiment, the network further comprises a trusted entity, and the method further comprises the step of establishing the identification address of the source node using the trusted entity.

In an embodiment, the network further comprises a database of trusted identification addresses maintained by the trusted entity, and the method further comprises the step of admitting the packet to the network relying on using the database and the identification address of the source node.

In an embodiment, a device implemented network for a transmission of data utilizing a packet comprises a plurality of nodes, the plurality of nodes being at least a source node and a destination node, the network being configured to transmit the packet from the source node to the destination node, a network protocol comprising a protocol in which source node credentials are presented to the destination node in a packet request and in which the destination examines the source node credentials and responds with a admit/reject packet and a trusted network interface configured to accept/reject the packet request sent by the source node for the destination node based upon the admit/reject packet sent by the destination node.

In an embodiment, the communication between the source node and the destination node further enables the source node and the destination node to agree on a shared private key to encrypt the packet.

In an embodiment, the trusted network interface utilizes the shared private key to verify an integrity of the packet.

In an embodiment, the admit/reject packet is cryptographically signed by the destination node.

In an embodiment, the trusted network interface is a component of the source node.

In an embodiment, the trusted network interface is physically separate from the source node.

In an embodiment, the trusted network interface comprises components located in both of the source node and physically separate from the source node.

In an embodiment, a method for controlling admission of a packet to a network having a plurality of nodes being at least a source node, a destination node and a trusted network interface, comprises the steps of transmitting a packet request comprising source node credentials from the source node to the destination node transmitting an admit/reject packet from the destination node to the source node base, at least in part, on the source node credentials and controlling admission of the packet to the network using the trusted network interface based on the admit/reject packet.

In an embodiment, the source node and the destination node engage in communication based, at least in part, on the controlling admission step, and the method further comprises the step of agreeing, between the source node and the destination node, on a shared private key to encrypt the packet based, at least in part, on the communication.

In an embodiment, the method further comprises the step of verifying, with the trusted network interface, an integrity of the packet with the shared private key.

In an embodiment, the method further comprises the step of cryptographically signing the admit/reject packet by the destination node.

FIGURES

DESCRIPTION

The entire content of U.S. patent application Ser. No. 13/427,233, filed Mar. 12, 2012 is hereby incorporated by reference.

Figure 1:
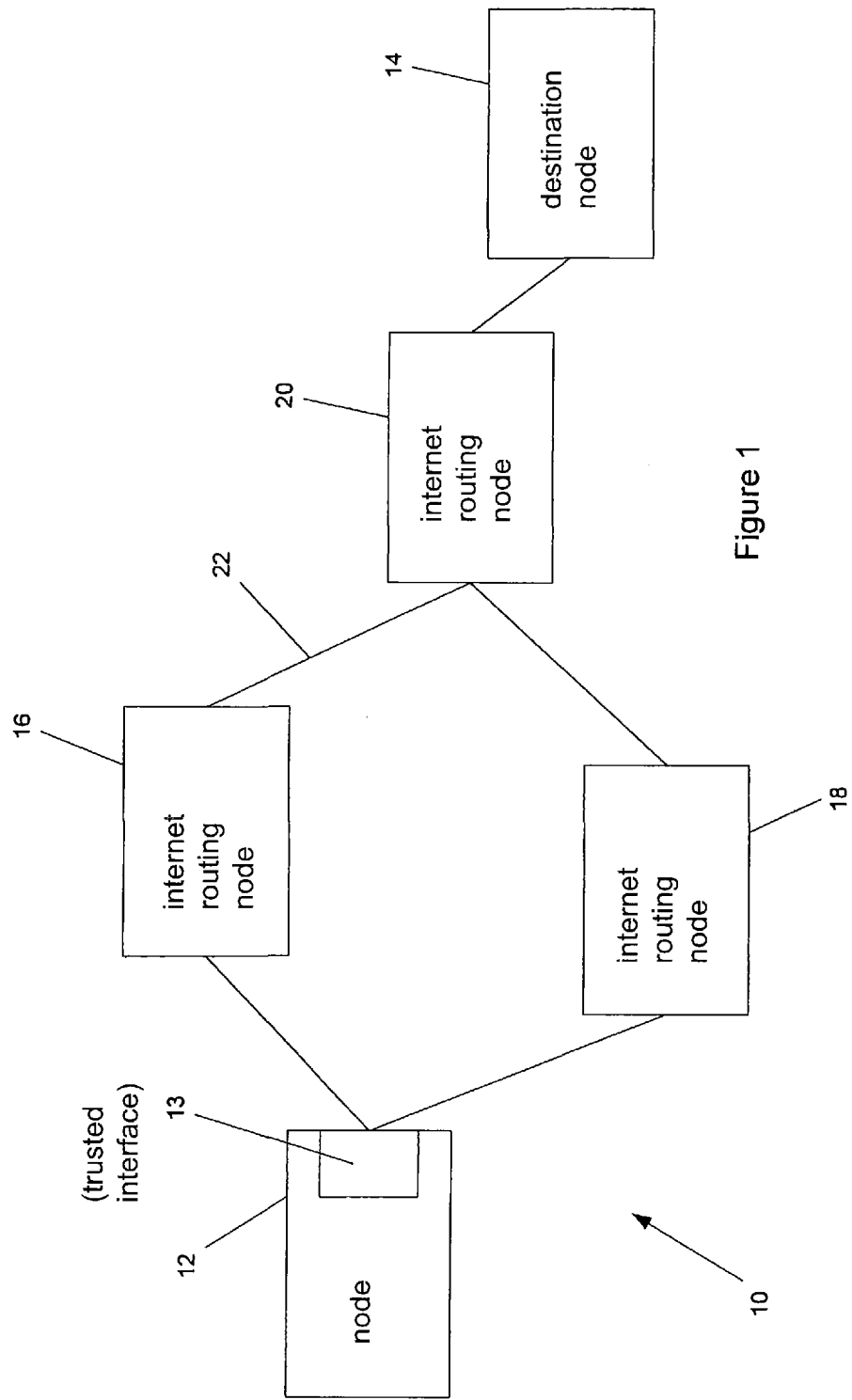
FIG. 1 is a block diagram of a network.

FIG. 1 is a block diagram of a highly simplified embodiment of a computer network 10, in an embodiment the Internet. Nodes 12, 14 may be nodes into which information may be initiated or terminated. At least node 12 may incorporate trusted network interface 13. Such nodes 12, 14 may be personal computers, workstations, personal digital assistants, smartphones or myriad additional devices which incorporate Internet connectivity. Alternatively, nodes 12, 14 may represent sub-networks of multiple devices which include an Internet portal, from which packets are placed on and received from the Internet 10. Nodes 16, 18, 20 are Internet routing nodes. Such routing nodes 16, 18, 20 accept data packets sent over the Internet 10 and forward the packets on so that the packets ultimately reach their destination. Nodes 12, 14, 16, 18, 20 are connected by physical and, in certain embodiments, wireless links 22. Different links 22 may operate at different data rates, limiting the amount of data, and thus the number of data packets, which may pass over the link 22 per unit time.

Conventionally, node 12 may transmit a data packet to node 14 by placing a packet header on the packet and transmitting it onto link 22. Routing nodes 16, 18 may receive the packet, note the destination node 14 and forward the packet appropriately. According to various schemes known in the art, only node 16 may forward the packet to destination node 14 because node 16 is only one step or "hop" from destination node 14. In alternative embodiments, node 18 may forward the packet to node 20 which may forward the packet to destination node 14 if an assessment of nodes 18 and 20 indicate that sending the packet over nodes 18 and 20 would be faster or consume fewer network resources than sending the packet to destination node 14 via the one-hop path of node 16.

Figure 2:
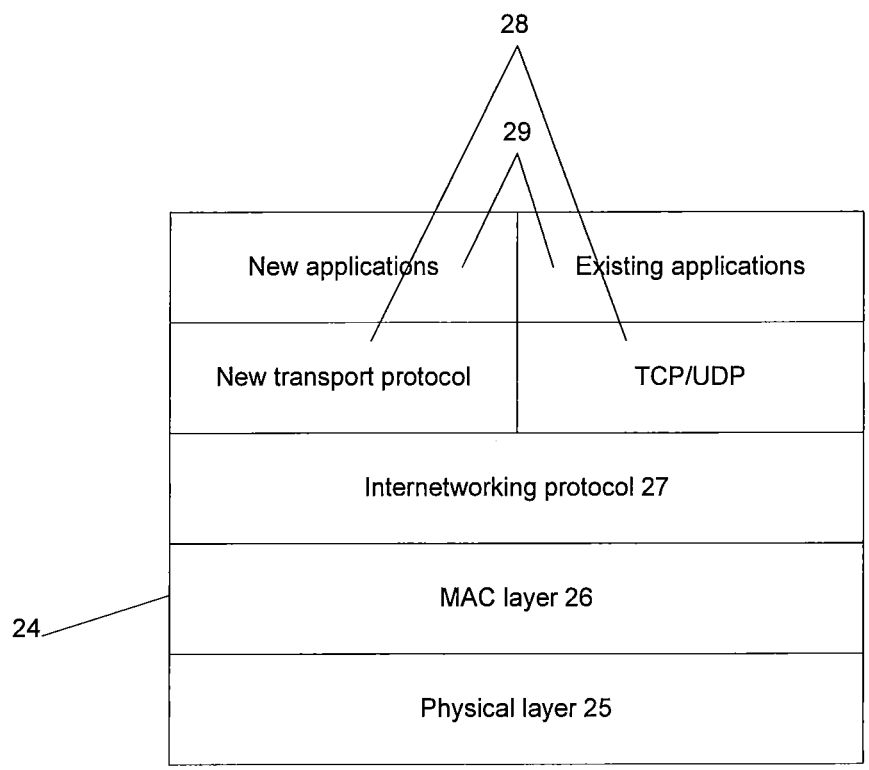
FIG. 2 is diagram of a protocol stack of the network of FIG. 1.

FIG. 2 is a diagram of a protocol stack, such as IP stack 24 of network 10. As discussed above, physical layer 25 is comprised of the actual hardware which comprises the Internet, from individual nodes 12, 14, 16, 18, 20 to the data transmission lines 22 over which data is transmitted. Media access control layer 26, or MAC layer, is an interface between physical layer 25 of Internet 10 which allow individual nodes 12, 14, 16, 18, 20 to communicate directly with one another without respect to Internet 10. Media access control layer 26 functions by providing one unique address or serial number to each node 12, 14, 16, 18, 20 in network 10, thereby allowing the members of network 10 to communicate across local repeaters and hubs but not over the Internet 10. Internet protocol layer 27 defines how various nodes 12, 14, 16, 18, 20 on network 10 are addressed and grouped together and how packets are labeled to route the packets from source node 12 in network 10 to destination node 14. Network protocol layer 27 interworks between the sub-networks over the Internet. Transport layer 28 provides legacy and new routing instructions attached to each data pack and includes, for instance, the transmission control protocol, or TCP. Applications layer 29 provides legacy and new programs and other software for use in connection with network 10, including, for instance, web browsers and other tools for accessing network content.

Combined, layers 25, 26, 27, 28, 29 constitute the hardware and software structure of network 10. Consistent with this underlying structure, network protocol layer 27 and transport layer 28 may incorporate various attributes to contribute to the security of network 10. In particular, at least protocol layer 27 may incorporate schemes to promote carrier-independent packet delivery service, privacy-preserving source attribution, network admission control, and data integrity and confidentiality.

In an embodiment, carrier-independent packet delivery may be promoted by incorporating a header for each packet which incorporates network layer 30 address of destination node 14 for the packet as well the address of source node 12 that originated the packet. In various embodiments, the network address is scalable to enable handling of billions of nodes. In an embodiment, the network address is consistent with the addressing format of Internet protocol version 6, incorporating a one hundred twenty-eight (128) bit addresses for source node 12 and destination node 14 for the packet. In alternative embodiments, different addressing schemes are utilized, both from alternative existing standards, standards yet to be created or promulgated, and propriety standards.

In an embodiment, privacy-preserving source attribution may be promoted by incorporating information relating to various aspects of the packet. Originating node 12 of the packet, the topological location of originating node 12 in network 10, and a particular individual user associated with originating node 12. In various embodiments, the individual user associated with originating node 12 is a registered owner of originating node 12 or a registered user of originating node 12. As will be discussed below, steps may be taken to preserve the privacy and anonymity of owners and users of originating node 12.

Conventional network protocol layer 30 standards may provide the address of originating node 12. However, absent any anti-spoofing mechanism, such addresses may be unreliable, allowing a malevolent actor to attack network 10 while maintaining anonymity. In addition, conventionally the assignment of network addresses to nodes 12, 14, 16, 18, 20 is ephemeral and dynamic. Thus, a network address may be assigned to different nodes 12, 14, 16, 18, 20 at different times and mobility of nodes may result in nodes 12, 14, 16, 18, 20 assuming different network addresses over time. Thus, the source address in a packet may not be reliable indicator of source node 12.

Figure 3:
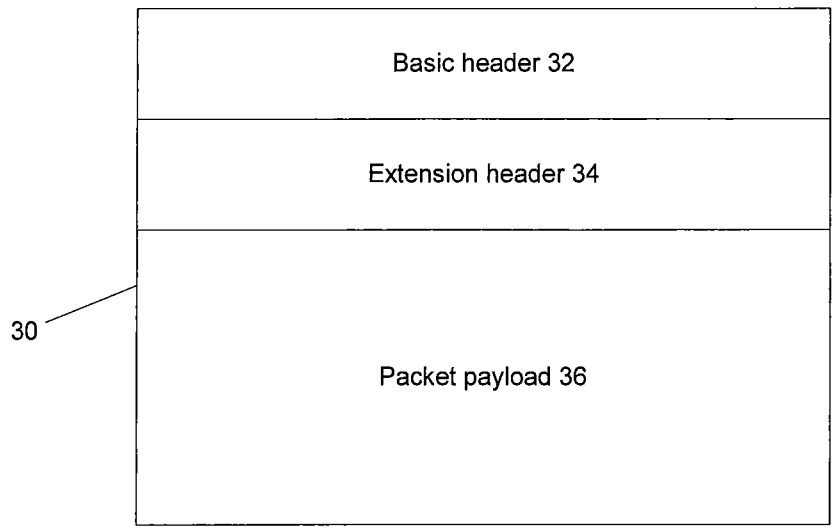
FIG. 3 is a diagram of a packet format.

FIG. 3 is a high level block diagram of data packet 30. Header 32 (FIG. 4) provides conventional information about packet 30. Extension 34 (FIG. 6) incorporates authentication information. Payload 36 incorporates data related to a data flow to be transferred from source node 12 to destination node 14.

In various embodiments, to enable the verification of the integrity of the contents of data packet 30 and to encrypt data payload 36, source node 12 and destination node 14 of a packet flow are configured to set up a shared private key. Doing so may permit source node 12 and destination node 14 to engage in a series of data transfers or a conversation by agreeing relatively rapidly on a shared private key by piggybacking key agreement messages over network admission control handshake packets. As such, a need for additional handshake messages such as that employed by the Internet key exchange protocols are obviated, thereby potentially reducing the latency and aspects of the complexity of the security association set-up process.

Figure 4:
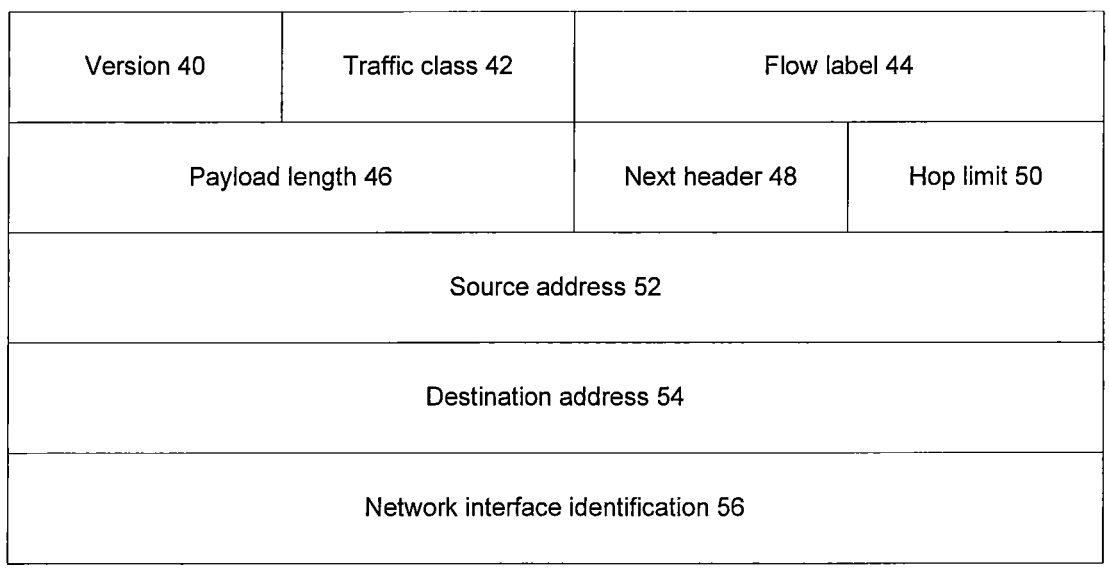
FIG. 4 is a diagram of a header for the packet of FIG. 3.

FIG. 4 depicts details of header 32 of packet 30. Many fields 38 are well understood in the art, and include version information 40, information on traffic class 42, a flow label 44, length 46 of payload 36, an identity 48 of a subsequent header 32, and a hop limit 50, regulating a number of intervening nodes 16, 18, 20 which may be accessed between source node 12 and destination node 14. In addition, header 32 includes a network address 52 of source node 12, a network address 54 of destination node 14 and a network interface identification 56.

Figure 5:
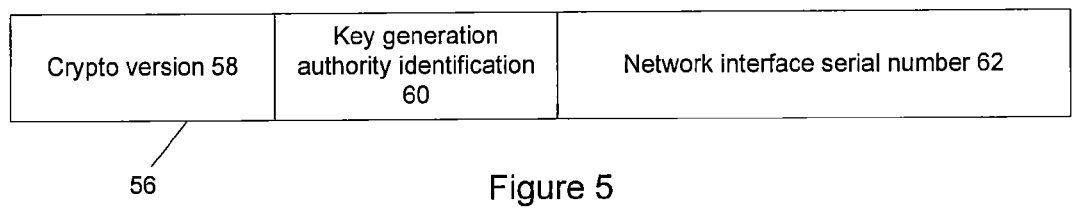
FIG. 5 is a diagram of a network interface identification field of the header of FIG. 4.

FIG. 5 provides detail of network interface identification 56, which encodes the immutable, globally unique, Internet-based encryption cryptographic identifier for source node 12. In particular, Crypto version number 58 indicates the ID-based encryption algorithm being used. Key generation authority 60 identifies the trusted authority that was used by the manufacturer of the network interface to obtain the private key. Finally, a network interface serial number 62 is incorporated.

To support source attribution, in various embodiments network 10 incorporates packet headers 32, 34. In various embodiments, source address 52 is universally unique identifier for source node 12 and a universally unique identifier 62 for the user or owner of source node 12 are incorporated. Both network interface identifier 56 and the user identifier 62 may be immutable identifiers that provide a one-to-one mapping from the identifier to the network entity that they name. In addition, packet 30 may carry information encoding the attributes of the user for use by the network admission control function described below. Taken together, network interface identifier 56, user identifier 62, and user attribute information (below) within packet 30 may provide the credentials of network protocol layer 30.

In various embodiments, network 10 utilizes compact self-attesting credentials. Identity-based encryption defines packet 30 format where network interface identifier 56 in the packer header represents an identity-based encryption public key of source node 12. In various embodiments, packet 30 also carries a signature generated by source node 12 using the private key corresponding to the public key. In various embodiments, the private key is maintained within the network interface of source node 12 and is configured or "burnt" into source node 12 during product development by a trusted authority. The private key for source node 12 may be supplied to the manufacturer of source node 12 by a predetermined key generation authority.

Destination node 14 of the packet may verify the authenticity of the signature of origination node 12 using the public key information within packet header 32, 34. In various embodiments, validation may occur without a need to access an external directory server maintained by a trusted authority or other source of validation information. In various embodiments discussed below, network 10 may support a built-in mechanism for key revocation.

In a conventional Internet architecture, a packet flow sourced from an attacker node, node 12 for instance, is transmitted over the network to the destination, for instance, node 14, and it is up to destination node 14 or a surrogate node fronting destination node 14, such as a firewall such as node 20, to detect the attack and discard the attack traffic. Failing this, the attack may succeed in impairing destination node 14 and/or network 10 carrying this traffic. A network admission control mechanism of IP stack 24 may prevent such attacks by ensuring that only packet flows that have been accepted by destination node 14 of these flows can enter the network. Unwanted packets may be terminated at a network interface of source node 12 even before the unwanted packet enters any part of shared network 10.

In various embodiments, such a network admission control function utilizes two mechanisms. The first mechanism is a signaling protocol to enable source node 12 of a user plane packet flow to request admission of that flow into network 10. In such an embodiment, source node 12 is configured to provide destination node 14 with verifiable information that it can use to determine whether the request should be accepted. The second mechanism is a tamper-resistant or tamper-proof policing function within source node 12 that reliably determines which flows have been admitted into network 10 and only allows admitted packet flows to leave source node 12.

In an embodiment, a flow admission control protocol controls is a network layer which provides the signaling protocol for admission to network 10. A two-packet handshake protocol builds upon the compact self-attesting credentials mechanism as described above to enable source node 12 to present its cryptographically-signed credentials to destination node 14. Destination node 14, upon verification and examination of the credentials, is configured to respond with a cryptographically-signed admit or reject packet 30 directed to source node 12. In a further embodiment, a trusted network interface at source node 12 generates and processes the signaling messages associated with the flow admission control protocol and filters out packet flow originating from an application on source node 12 that has not been accepted by destination node 14.

In an embodiment, an identity-based encryption scheme enables a party to generate a public key from a known identity value such as an ASCII string, such as the ASCII representation of network interface identification field 56 of the packet header. A trusted authority generates private keys corresponding to the Internet-based encryption public keys. In an embodiment, the trusted authority first publishes a master public key, and securely maintains the corresponding master private key. Given the widely known master public key associated with the trusted authority, any party can compute a public key corresponding to network interface identification field 56 by combining the master public key with the identity value. To obtain the corresponding private key, the party authorized to use network interface identification field 56 may contact the trusted authority, which uses the master private key to generate the private key for network interface identification field 56.

In various embodiments, where the identity of node 12 serves as its Internet-based encryption public key, the manufacturer of node 12 may contact the trusted authority to obtain the private Internet-based encryption key for node 12. There may be one or more trusted authorities. In an embodiment, nodes 12, 14, 16, 18, 20 are be pre-configured with a look-up table that maintains a list of trusted authorities and the master public key associated with each of the trusted authorities.

In various embodiments, packet 30 may be further configured to carry a routing direction vector that would enable network routers to determine how to forward packet 30 in a manner that scales with the speed and size of the network. In various embodiments, the routing direction vector is attained by source address 52 and destination address 54. In addition, packet 30 provides source attribution information that enables authorized network entities to derive properties of packet 30 without violating privacy rights of users of network 10. Further, packet 30 is configured to support encryption and integrity verification.

Figure 6:
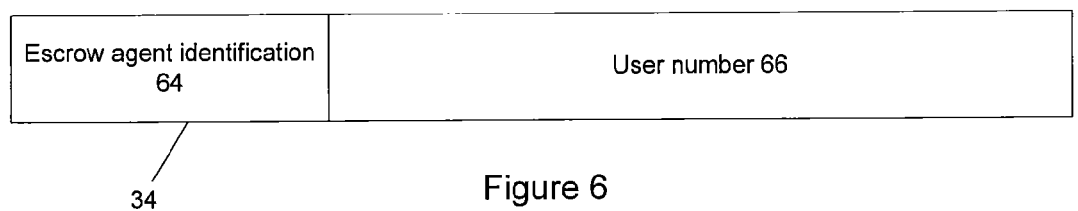
FIG. 6 is a diagram of an extension header for the packet of FIG. 3.

FIG. 6 is extension header 34. As illustrated, extension header 34 contains escrow agent identification 64 and user serial number 66. User serial number 66 is a universally unique integer value that identifies the network entity that assumes responsibility for or that is accountable for network traffic originating at the network interface identified in network interface identification 56 of packet 30. This network entity may be either a network user, such as a user of a network-attached computer with the network interface, or an owner, such as the owner of the router containing the network interface. Escrow agent 64 is a trusted authority that issues user serial number 66 to entities after appropriate verification of their authenticity. Escrow agent 64 may maintain the mapping between the actual real-world identity of network entities that it serves, such as source node 12 and user serial numbers 66. To obtain the actual identity of an entity corresponding to user serial numbers 66 contained in packet 30, a third party may have to approach the escrow agent identified in the escrow agent identification 64 field of extension header 34. Extension header 34 may incorporate additional fields which contain the Internet-based encryption signature generated by source node 12 for packet 30 and covers the assured internetworking protocol header fields and the payload.

In various embodiments, packet 30 incorporates routing scalability properties of the IPv6 addressing architecture, such as efficient route aggregation for a network with billions of network elements. Packet 30 may also enable the leveraging of existing high-speed packet processing technologies, such as network processors and ASICs, optimized for handling IPv6 headers at multi-gigabit per second line speeds, thereby enabling performance scalability of the fast path of the data plane.

In the illustrated embodiments, the source network address 52 and network interface identification 56 of header 32 carry the "where" and "what" information for source attribution, while extension header 34 of packet 30 optionally identifies "who" originated packet 30. An interface configuration protocol combined with the node admission control protocol (below) may reduce a likelihood that these pieces of information are falsified or spoofed by source node 12. Source attribution may preserve the privacy rights of users by not directly divulging the identity of the user within header 32, 34, with only the user identification information, consisting of user number 66 and escrow agent identification 64 is divulged in packet 30. Thus, in various circumstances, to derive the user identity from this information, an investigator may approach the escrow agent for the user who may only reveal the user identity with the consent of the user or if the governing laws permit such disclosure.

Source attribution may thus be enabled, at least in part, by decoupling of network interface identification 56 from the network address of that interface, i.e., source node address 52. Network interface identification 56 is a globally unique immutable attribute that identifies a network interface. Source node address 52 is in ephemeral attribute that codifies the current topological location of that interface on the network. This contrasts with conventional networking interfaces, where the IP address conflates the name and location attributes of the interface, making it difficult to derive source attribution information.

In various embodiments, each node 12, 14, 16, 18, 20 provides functionality of bind the four components of its credentials together, i.e., network address 52, network interface identification 56, user identification 66 and user attributes (below). In an embodiment, to join network 10, the network interface of node 12 presents its signed credentials to one-hop neighbor nodes 16, 18 using a Node Join Protocol. However, before node 12 can join network 10 and start transmitting data packets 30, node's 12 network interface may be configured with network address 52 and the user identification components 66 of its credentials; in various embodiments network interface identification 56 is already pre-configured on node 12.

Figure 7:
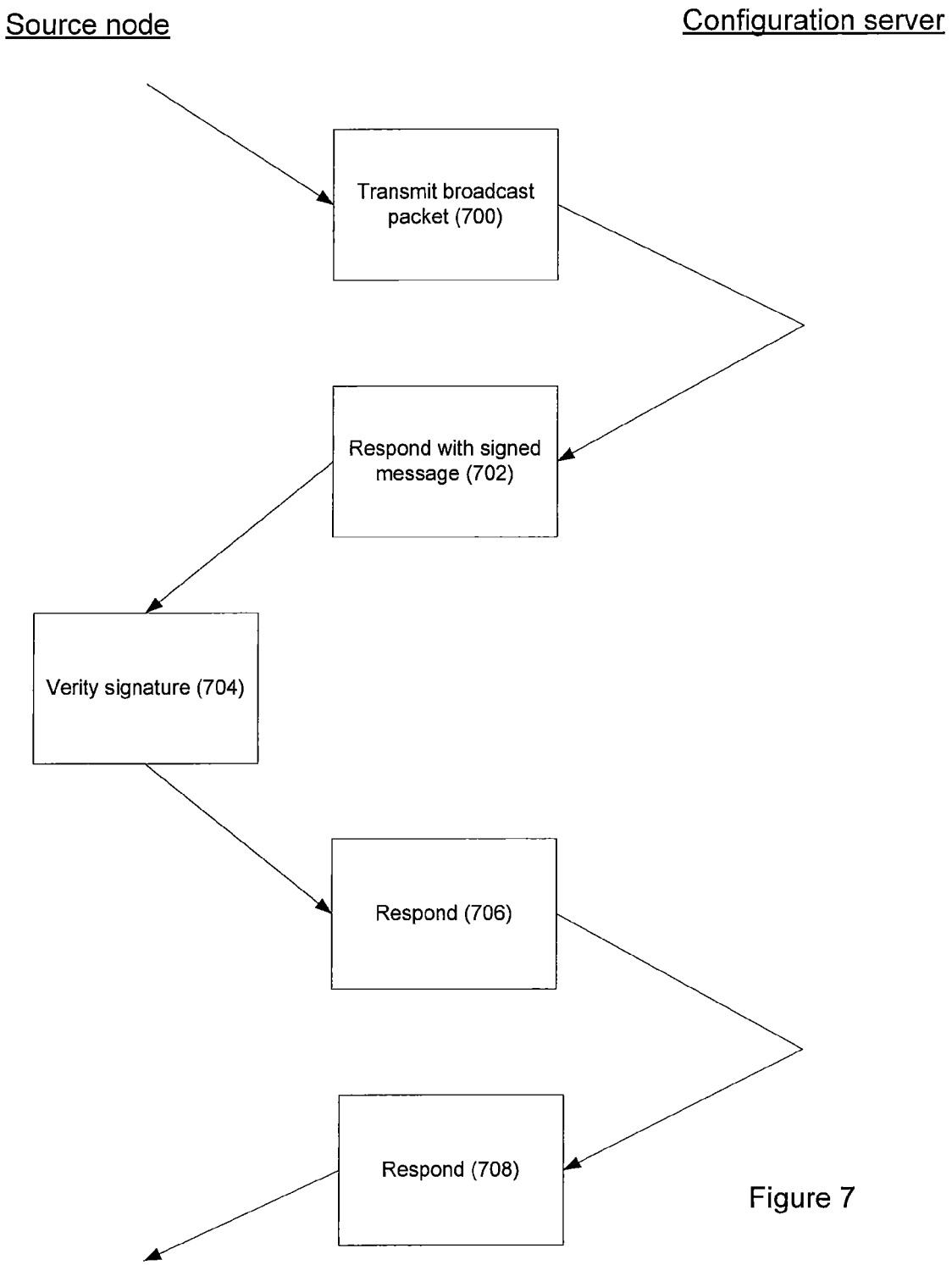
FIG. 7 is a flowchart for an interface configuration protocol of the network of FIG. 1.

FIG. 7 is a flow diagram for an interface configuration protocol. An initiating network interface, such as source node 12, transmit (700) a link-local broadcast packet requesting configuration. A trusted interface configuration server resident on network 10, such as node 16, responds (702) with a signed message containing, in various embodiments a client puzzle, credentials attesting to the configuration server's legitimacy as a configuration server and a public key, such as a Diffie-Hellman public parameter, known in the art. The client puzzle is included in various configurations to protect the configuration server against attacks such as denial of service attacks in manners similar to those well known in the art.

The initiating network interface then verifies (704) the Internet-based encryption signature of the configuration server. In various embodiments, the verification is performed utilizing network interface identification 56 of the response of the configuration server. In an embodiment, source node 12 utilizes key generation authority field 60 of network interface identification 56 as an index into its look-up table to determine the public master key for the key generation authority and derive the Internet-based encryption public key corresponding the configuration server's network interface. Thereafter, node 12 can verify the source authenticity and integrity of a received packet 30 and subsequently verify the credentials of the configuration server. Upon verification, source node may, if applicable, respond (706) with a signed packet 30 containing the solution to the puzzle and its Diffie-Hellman public parameter.

After verification (704), the configuration server is configured to respond (708) with an encrypted packet 30 containing the network address 52 assigned by it to source node 12 as well as other configuration information such as the default router to be used by source node 12. In various embodiments where applicable, the configuration server may use the shared secret key derived via the Diffie-Hellman exchange to encrypt the response packet 30.

At the end of the interface configuration protocol, node 12 may be able to bind a network address 52 to its network interface name. The interface configuration protocol thus dynamically assigns network addresses 52 and other configuration information for the network interfaces of nodes 12, 14, 16, 18, 20 that are endpoints. In an embodiment, manual configuration of the addresses 52 of the network interfaces for elements of network 10 such as router elements. In alternative embodiments, automatic configuration of such elements is also envisioned.

The binding of user identification 66 along with the attributes of the user to the network interface name may be accomplished through the use of a crypto-token. Each network interface of nodes 12, 14, 16, 18, 20 may be configured to support a physical communication port, such as a USB slot or RJ-45 port, into which a crypto-token can be inserted. In various embodiments, the crypto-token may be configured to carry information including an identification of the user or owner or service that was issued the crypto-token by a trusted credentialing authority, attributes associated with user identification, such as an end-user willing to be de-anonymized by government authorities only, an operator associated with a telephone, data or Internet provider, and password and other information needed for two-factor authentication of the holder of the crypto-token, as known in the art. The network interface of nodes 12, 14, 16, 18, 20 may authenticate the holder of the crypto-token and then incorporate the attributes of the user that may be associated with network interface identification 56.

In alternative embodiments, networks 10 which utilize approaches not tied to crypto-tokens are also contemplated. In various embodiments, an end-user of network 10 may choose to be "un-credentialed" or anonymous while using a node 12 connected to network 10. A user may be uncredentialed, for instance, when the user accesses network 10 from a public computer. In this case, user identification 66 and user attributes components of the credentials for the node 12 that the uncredentialed user is accessing may be configured to carry NULL value indicating the user that wishes total anonymity. In various embodiments, such anonymous users may have reduced accessibility on network 10, for instance only being able to accesses network applications that accept packet flows from un-credentialed users.

In various embodiments, all nodes 12, 14, 16, 18, 20 in network 10 are compliant with network 10. In such embodiments, all endpoint nodes are equipped with trusted network interfaces, such as network interface cards, and all routers are trusted assured internetworking protocol-enabled nodes that are configured to not initiate malicious actions. In an embodiment, to provide compliant network property, each node 12, 14, 16, 18, 20 is configured to verify that each of its one-hop neighbors in network 10 is compliant with network 10 and carries credentials that are acceptable to network 10 standards. A node join protocol described below implements such verification procedures.

Before a node 12 can start transmitting user plane data traffic, nod 12 must first join network 10. To do so, the network interface of node 12 executes a four-packet node join protocol similar to the interface configuration protocol detailed in FIG. 7. Node 12 transmits a link-local broadcast packet 30 requesting permission to join network 10. A first-hop neighbor of node 12, such as node 16, is configured to respond with packet 30 containing, in certain embodiments, a client puzzle and a cryptographic public key, such as a Diffie-Hellman public parameter. For endpoint nodes, such as nodes 12, 14, the responding first-hop neighbors may be elements such as Ethernet switches or wireless access points. For routers, the responding first hop neighbors may be other routers or configured switches and wireless access points.

Node 12 may process the response packet 30, in various embodiments solve the puzzle, and send the solution to this puzzle along with its credentials, and its Diffie-Hellman parameter in an encrypted and signed packet 30 to first-hop neighbor node 16. Node 16, upon verifying the signature and integrity of node 12, may examine the credentials of node 12 to determine whether node 12 satisfies the node admission criteria for network 10. If node 12 presents valid credentials, the node 16 may send packet 30 granting node 12 permission to join network 10. If, however, the credentials of node 12 are invalid, node 12 may be sent a rejection message. Credentials of node 12 may fail, for instance, if the credentials were revoked by a credential revocation protocol.

In various embodiments, network 10 seeks to ensure that a packet flow originated by an application at source node 12 will only enter the network if the destination node 14 of the packet flow accepts the packet flow. The network interface at source node 12 may, in various embodiments, filter all originated packets 30 at source node 12 before originated packet 30 enters any part of network 10. The flow admission control protocol that is, in various embodiments, implemented within each network interface of nodes 12, 14, 16, 18, 20 is configured to perform, at least in part, this filtering.

Figure 8:
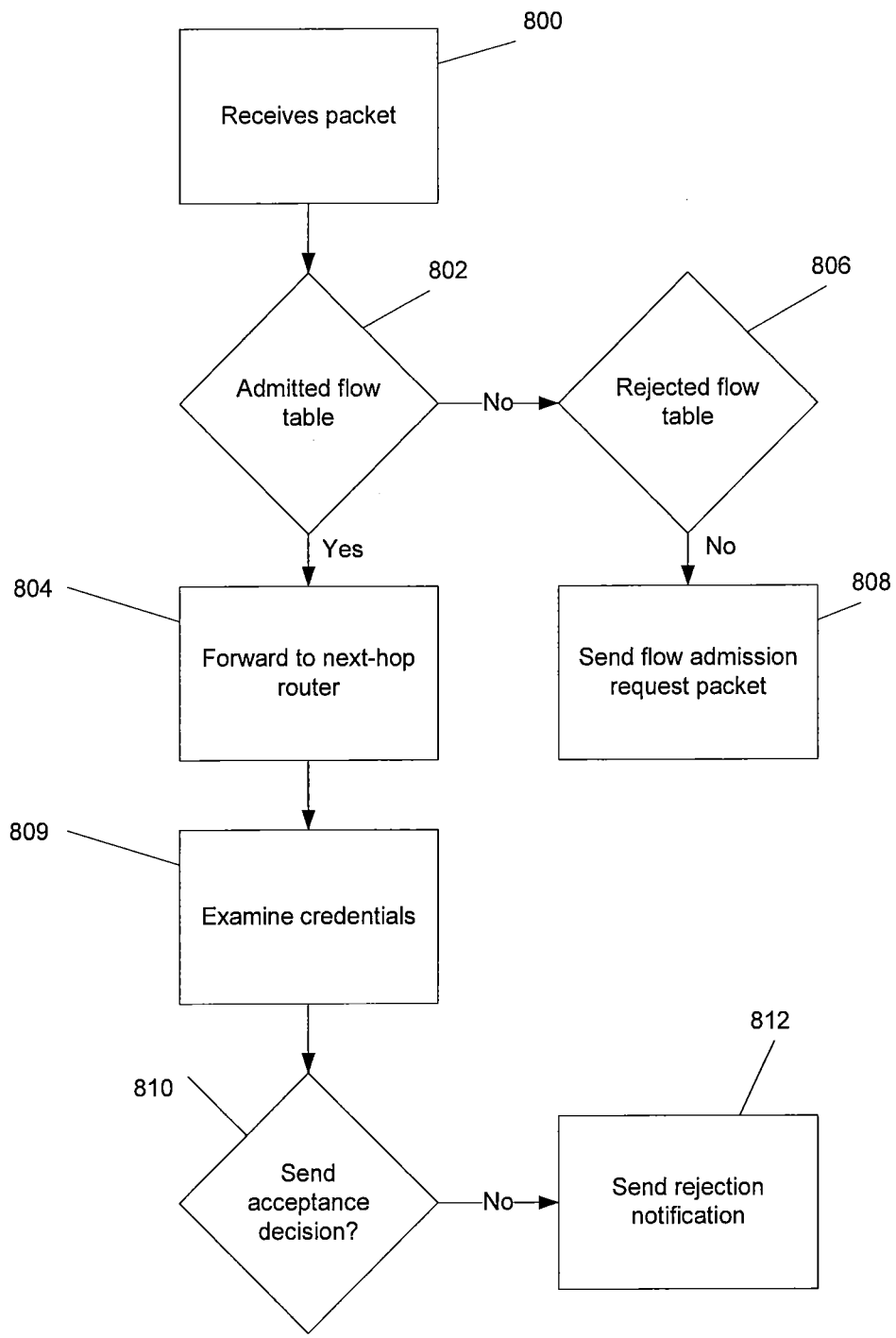
FIG. 8 is a flowchart for managing packet admission to the network of FIG. 1.

FIG. 8 is a flowchart for managing packet admission to network 10 at source node 12. When network interface 13 of source node 12 receives (800) a data packet 30 from an application on source node 12 it first checks (802) an admitted flows table maintained by the network interface of node 12 to determine if it contains an entry indicating that destination node 14 of the packet flow has accepted the packet flow. If so, packet 30 is forwarded (804) to next-hop router 16 for destination network address 54. If not, the network interface of node 12 may check (806) a rejected flows table to determine whether this flow has been rejected by destination node 14 previously. If so, packet 30 may be dropped. Otherwise, the network interface of node 12 sends (808) a flow admission request packet to destination node 14 of the packet flow. Packet 30 may be configured to carry the credentials of source node 12 and contain the Internet-based encryption signature of node 12 in an authentication extension header 34.

Upon verifying the authenticity and integrity of the flow admission request packet 30 from source node 12, destination node 14 may examine (809) the credentials of source node 12 to determine if the credentials of source node 12 meet the criteria specified by a local policy. If so, destination node 14 may send (810) an acceptance decision in a flow admission response directed at source node 12 along, in various embodiments, with a client puzzle. Otherwise, destination node 14 may send (812) a rejection notification to source node 12 in a flow admission response. In various embodiments, if source node 12 received an acceptance notification from destination node 14, source node 12 may add destination node 14 to an admitted flow table. If source node 12 receives a rejection instead, destination node 14 may be added to a source node 12 rejected flows table. In an embodiment, upon receiving an acceptance notification, source node 12 is configured to solve the client puzzle and piggyback the solution to the puzzle in a data packet 30, in an embodiment a first data packet 30, that is sent to destination node 14. As noted earlier, the client puzzle mechanism may serve to thwart flooding denial of service attacks directed at destination node 14.

The flow admission control protocol may also double as a key exchange protocol, using a cryptographic system, such as a Diffie-Hellman handshake, to enable source node 12 and destination node 14 to establish a secret key to encrypt and sign subsequent data packets 30 between the source node 12 and destination node 14. To accomplish this key exchange, source node 12 may be configured to send its Diffie-Hellman public parameter in the flow admission request packet 30 and encrypt the Diffie-Hellman public parameter using the Internet-based encryption public key of destination node 14, in various embodiments to prevent man-in-the-middle attacks. Destination node 14 may send its Diffie-Hellman public parameter in the flow admission response packet 30 and encrypt the Diffie-Hellman public parameter using the Internet-based encryption public key of source node 12. In contrast with known Internet protocols, such an approach may simplify considerably the establishment of a security association between source node 12 and destination node 14.

After the initial, two-packet exchange the flow admission control protocol may be executed at periodic intervals during the lifetime of a packet flow. The entries within the flow tables of the network interface may be maintained as soft state and may be subject to being refreshed periodically to prevent their expiration. Such a protocol may help protect receivers such as destination node 14 from unwanted packet flows from a sender such as source node 12 by filtering the unwanted flow at the network interface of source node 12. Also, man-in-the-middle attacks on packet flows may be blocked given the trusted nature of the routers on the path from source node 12 to destination node 14.

In various embodiments, network 10 may incorporate a credential revocation mechanism which does not relying on network services such as routing to prevent design circularity. Network 10 may utilize a network interface of some or all of nodes 12, 14, 16, 18, 20 being configured with the Internet-based encryption public key of a set of network command authorities that are trusted by network interfaces of network 10 and from whom network 10 is configured to accept commands to revoke the credentials of a particular network interface of network 10. In various embodiments, network command authorities may include national government agencies, international bodies and trusted private entities.

A network command authority may issue a command to revoke the credentials of one or more network interfaces, identified by network interface identification 56, using a network credential revocation packet 30. In an embodiment, the network credential revocation packet 30 may be flooded throughout network 10. A network interface receiving a network credential revocation packet may verify the authenticity and integrity of the network credential revocation packet 30. If the network credential revocation packet 30 passes verification, the network interface may store the identity of the revoked network interface in a non-volatile storage. Additionally, if the revoked network interface is currently a neighbor, the network interface may remove the revoked network interface from a neighbor list and cease further communication with the revoked neighbor. If a revoked network interface attempts to join the network, it may be rejected by the join protocol (above).

So configured, the network credential revocation protocol may provide that network 10 interfaces with valid credentials and that invalid credentials are isolated from network 10. Since compromise of a network command authority may undermine, to an extent, network 10, additional approaches for safeguarding network 10 may be applied. In an embodiment, network interfaces may be configured such that credential revocation occurs only if two or more network command authorities revoke the credential.

In various embodiments, network 10 may incorporate internetworking protocol layer 27 configured to implement a set of network services to support assured network applications. In various embodiments, these services include some or all of assured name lookup, assured mobility, assured policy management, user credential verification, network routing, quality of service provisioning, network monitoring, network forensics support and Internet co-existence support.

In various embodiments, a network application, such as a web server, may be associated with a globally unique network name, such as a particular URL, that can be used by the clients of that application to access the application. In various embodiments, assured name lookup maintains a client-verifiable mapping between a network name and a network interface address 52 associated with the named application. The client-verifiable binding between a network name of an application and its network interface may be accomplished using a notion of certifiable naming records.

The network interface associated with a named application may be responsible for registering a certifiable naming record for that application with an assured named lookup service. In various embodiments, the certifiable naming record includes of the following fields: the network name of the application, network interface address 52, network interface identification 56 of the network interface, and the Internet-based encryption signature of the network interface. When the assured name lookup service receives a registration request for a naming record from a network interface, the assured name lookup service may verify the Internet-based encryption signature of the record to ensure authenticity and integrity. When a client of the application requests the assured name lookup service to resolve the network name of the application, the certifiable naming record corresponding to that name may be returned to the client. Thereafter, the client may independently verify the Internet-based encryption signature on a record from the information contained within the client to establish a validity of the naming record. Such a procedure may reduce an effectiveness of attacks, such as denial of service attacks on the Internet, that provide clients with falsified binding between network names and network addresses. In certain aspects, the assured name lookup service may perform a function related to Secure DNS in the current Internet architecture, though with reduced complexity relative to Secure DNS.

Assured mobility may provide the network layer functionality needed to support mobility of endpoint nodes 12, 14 in network 10. Assured mobility may, in certain respects, provide related services to mobility services implemented within Internet protocol Version 6. However, decoupling of the network address of an interface from the network name of that interface in network 10 may be simpler and more efficient implementation of the mobility services akin to contemporary mobility services.

Assured policy management may be implemented within each network administrative domain to provide a secure configuration of the network interface within that domain with traffic admission control policies. In an embodiment, a trusted policy server within the administrative domain is implemented that may be invoked by each network interface in that domain as part of an interface configuration protocol. The trusted server may then provide the interface with specific traffic control rules, related in certain respects to firewall rules, that may be enforced during operation.

User credential verification may implement a scalable distributed lookup service that can be accessed by a network interface when a user logs on to network 10 to determine whether the user's credentials have been revoked. If so, the user may be precluded from accessing network 10 by that interface. While the network credential revocation protocol may provide a built-in, standalone mechanism within network 10 for revoking the credentials of any entity, such as network interface identification 56 or user identification 66, within network 10 the network credential revocation protocol may not, in various embodiments, be configured to revoke end-user credentials. The flooding based mechanism of the network credential revocation protocol may not, in various embodiments, scale for a credential revocation scenario involving billions of end users. Accordingly, user credential verification may be implemented to address end user credentials.

Network routing may implement intra-domain routing protocols, related in certain respects to OSPF, as known in the art, as well as inter-domain routing protocols, related in certain respects to BGP, as known in the art, for network 10. Network routing may explore how the built-in assurance capabilities of network 10 can be utilized to improve a robustness of existing protocols. Alternatively, protocols with capabilities such as multi-path routing and quality of service-based routing may be applied to further enhance the resilience and versatility.

Quality of service provisioning may implement signaling protocols that can be invoked by an application to request and obtain network services addressing its quality of service needs. Network monitoring may provide reliable operation of the network by providing network layer functions for monitoring the performance and health of network elements. Network 10 may go beyond traditional network monitoring, such as SNMP, as known in the art, to incorporate mechanisms and functions within the internetworking protocol layer 27 to enable the real-time detection and monitoring of security attacks on network 10, such as denial of service attacks.

Network forensics support may utilize a built-in capability for source attribution within network 10. As such, network forensics support may provide certain functions to support post-facto investigation of network incidents such as intrusion attacks, fraud, and unlawful activities. Logging and time-stamping of selected traffic may be considered to derive a temporal indication for when an attack was initiated.

Internet co-existence support may be utilized to accommodate legacy applications, such as the existing Internet. Endpoint nodes 12, 14 may, in various embodiments, be equipped with separate virtual machines or other related hardware or software applications, with one running network 10 protocol stack 24 and the other running conventional IP. The network interface may provide two separate physical ports—one connecting to network 10 routers and another connecting to IP routers. Doing so may provide isolation of network 10 and IP traffic entering and leaving endpoint node 12, 14. In effect, in various embodiments, two parallel internetworks may be provided, i.e., network 10 and the existing Internet, that are logically isolated from one another. It is further contemplated that more than two internetworks may be operated in parallel.

Address spoofing prevention, privacy-preserving source attribution, and network admission control may, in various embodiments, combine to prevent or deter security attacks on network 10. Packet flooding distributed denial of service attacks, as known in the art, primarily spoof source address 52 of the IP packets 30 that are sent in a torrent at a victim node 14 from multiple nodes 12, 16, 18, 20 on network 10. The trusted network interface of network 10 may reduce or prevent spoofing of network addresses 52. In the event that a packet flood originates from compromised applications resident on network 10 endpoint node 12 and contains valid source addresses 52 on packets 30, victim node 14 may be able to deny admission to these packet flows. Furthermore, with source attribution provided by network 10, source node 12 and potentially source node's 12 users may be identified, potentially allowing corrective action to be taken.

Route falsification attacks that exploit control plane vulnerabilities in routing protocols such as OSPF and BGP, as known in the art, are, in some circumstances, more insidious than user plane attacks such as packet flooding. In an embodiment, network 10 may reduce or prevent such attacks by enabling address spoofing prevention, privacy-preserving source attribution, and network admission control to utilize network's 10 compact self-attesting credentials mechanism to reduce a likelihood that unauthorized nodes masquerade as legitimate OSPF or BGP routers. Furthermore, in various embodiments, address spoofing prevention, privacy-preserving source attribution, and network admission control, among others, may be further fortified using the credentialing capabilities supported by network 10 to reduce or prevent falsification of routing information such as reachability by legitimate but potentially compromised routers.

Transport layer attacks, such as SYN attacks and SYN reflection attacks, as known in the art, that attempt to exhaust the connection buffer resources of a victim by sending it a flood of half-open connection requests, are a common attack scenario that has been encountered on the Internet. Network 10, in contrast to various protocols of the Internet, may, in various embodiments, reduce or prevent such attacks by eliminating common vulnerabilities, such as through source address spoofing. Non-spoofed packet floods sent from node 12 may be blocked by the client puzzle mechanism of certain embodiments of network 10 that may induce node 12 to expend its own processing resources for such attacks, reducing node's 12 resources to conduct such attacks.

In SYN reflection attacks, an attack node 12 spoofs the source address 54 of a victim node 14 and sends TCP SYN requests containing source address 54 to a number of nodes 16, 18, 20. In such an attack, some or all of these nodes 16, 18, 20 responds with a SYN/ACK directed at node 14, as known in the art, resulting in a packet flood directed at node 14. Network 10 may reduce or prevent an attacker from spoofing source address 54 of node 14, thereby precluding or otherwise reducing SYN reflection attacks. In another scenario, node 14 may contain a compromised application that sends TCP SYN requests to a large number of nodes 12, 16, 18, 20 on network 10 as part of an insider attack. The resulting SYN/ACK flood may saturate network 10 access link of the LAN containing node 14. The client puzzle mechanism used in the flow admission control protocol of network 10 may, however, it impractical for such insider attacks to be launched. Furthermore, the network interface of node 14 may prevent it from opening spurious TCP connections in the first place to prevent the attack from ever being launched.

Application layer attacks, such as e-mail spam and "phishing", are pervasive on the Internet. Spammers commonly rely or either "open" SMTP servers, as known in the art, to relay bulk e-mails surreptitiously or rely on the use of proxies to fake the source of e-mails. Network 10 may reduce or preclude the use of either of these approaches using the credentials based admission control protocol. SMTP servers, for instance, may, in various embodiments, refuse to connect to any other SMTP server whose credentials do not certify it as being a "closed" server. With regards to "phishing", network 10 may, in an embodiment, present a user with the name of the actual site in case the user invokes the link, thereby potentially alerting the user to fraudulent links.

Figure 9:
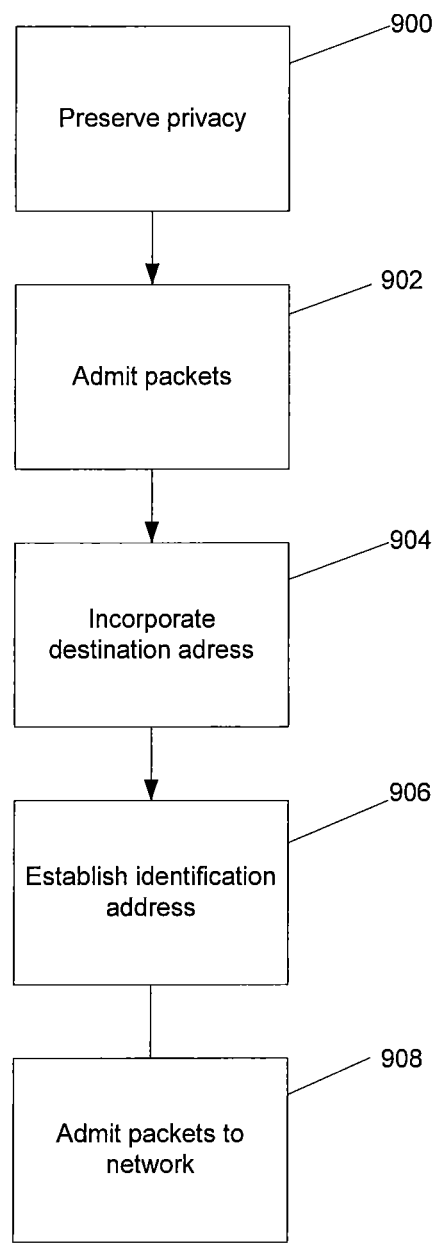
FIG. 9 is a flowchart for communicating over of the network of FIG. 1.

FIG. 9 is a flowchart for communicating over a network between nodes 12, 14 using a device implemented, carrier independent packet delivery universal addressing network protocol having IP stack 24. Privacy of source node 12 is preserved (900) using a privacy preserving source node attribution of internetworking protocol layer 27. Packets 30 are admitted (902) onto network 10 only if source node 12 admits packet 30. Both source address 52 and destination address 54 are incorporated (904) into packet 30. A trusted entity may establish (906) an identification address, such as source address 52 or network interface serial number 62. Network 10, and in various embodiments, individual nodes 12, 14, 16, 18, 20 of network 10, incorporate a database of trusted identification addresses maintained by the trusted entity, and packets 30 are admitted (908) to network 10 relying on the database and the identification address.

Figure 10:
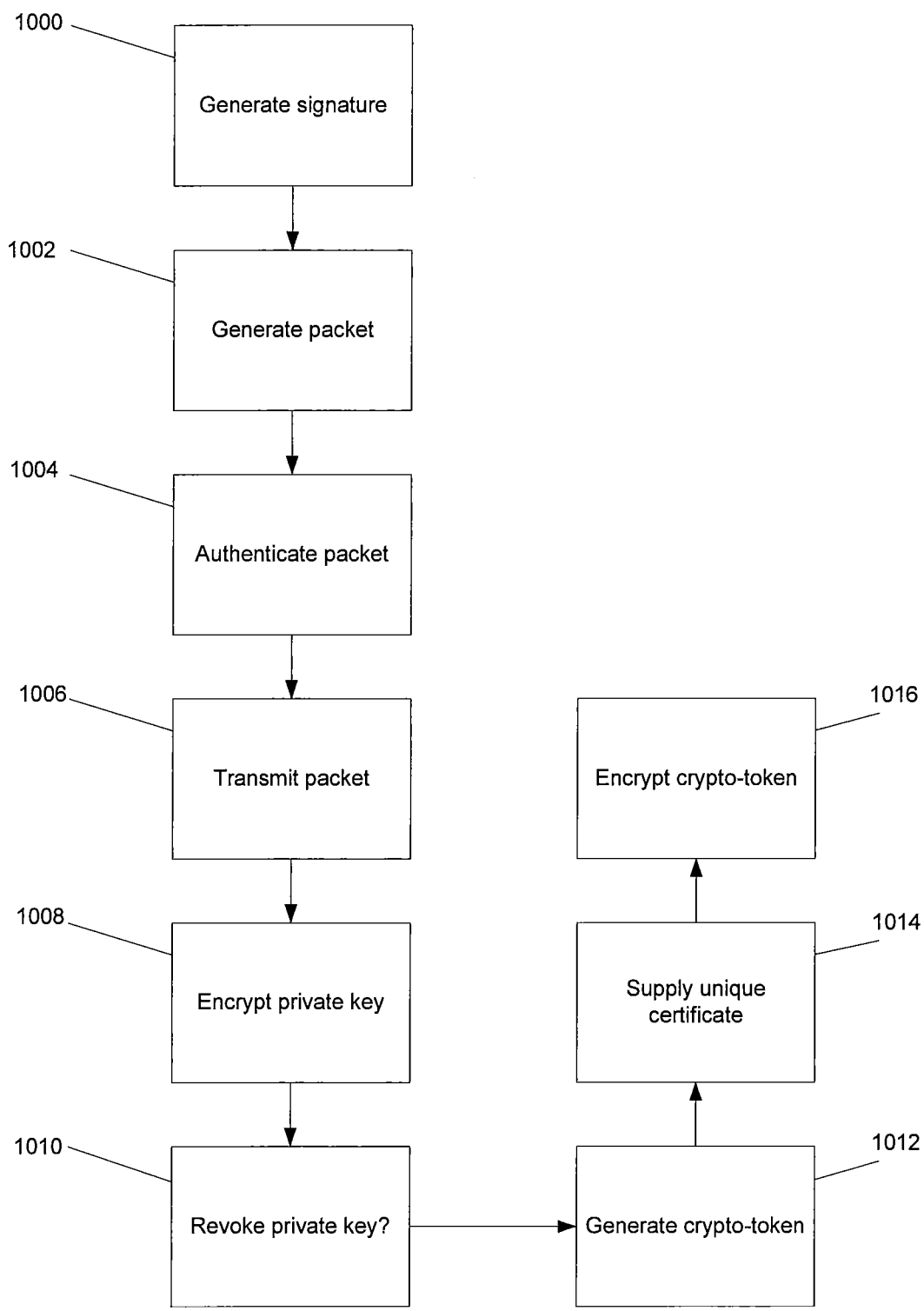
FIG. 10 is a flowchart for attributing a source of a packet over the network of FIG. 1.

FIG. 10 is a flowchart for attributing a source of a packet 30 in network 10.

A signature is generated (1000) for source node 12 using a private key. Packet 30 is generated (1002) with the signature and source address 52. Packet 30 is authenticated (1004) based on the signature and source address 52. Packet 30 is then transmitted (1006) based on the authentication.

In various embodiments, packet 30 is generated with attribute information indicative of a status of source node 12. In an embodiment, the private key is encrypted (1008) according to an encryption scheme managed only by the trusted authority. The private key may be revoked (1010) such that source node 12 does not obtain authentication (1004) of packet 30 and does not transmit (1006) packet 30. A crypto-token having a unique certificate indicative of an authenticity of source node 12 and user number 66 may be generated (1012). The trusted authority may supply (1014) the unique certificate and encrypt (1016) the crypto-token.

Figure 11:
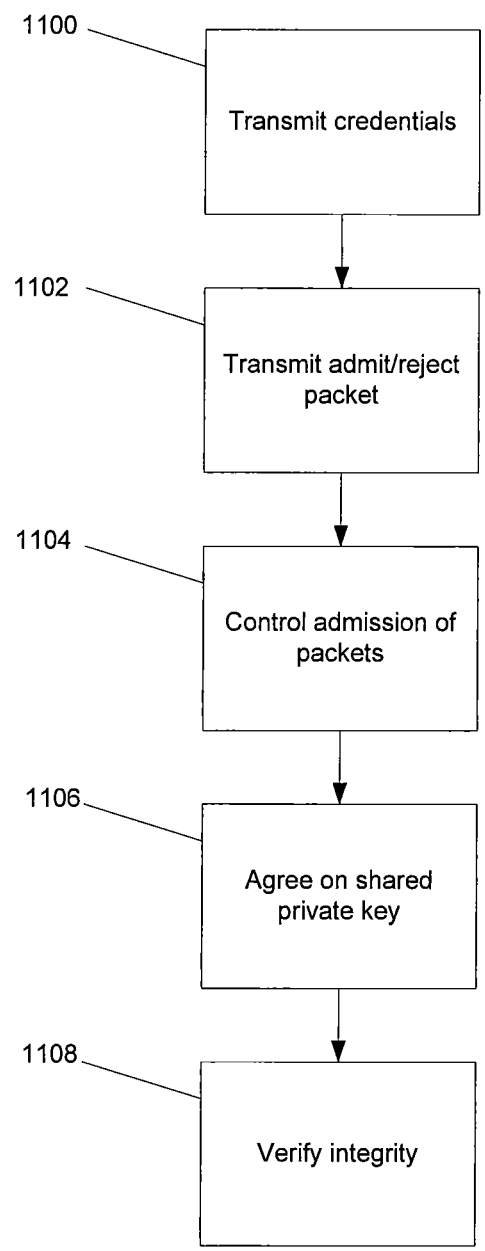
FIG. 11 is a flowchart for controlling admission of packet to the network of FIG. 1.

FIG. 11 is a flowchart for controlling admission of packet 30 to network 10. A packet request having source node 12 credentials is transmitted (1100) from source node 12 to destination node 14. An admit/reject packet 30 is transmitted (1102) from destination node 14 to source node 12 based, at least in part, on the source node credentials. Admission of packet 30 to network 10 is then controlled (1104) using a trusted network interface 13 based on admit/reject packet 30.

In various embodiments, source node 12 and destination node 14 agree (1106) on a shared private key to encrypt packet 30 based, at least in part, on communications or a packet flow. Trusted network interface 13 may verify (1108) an integrity of packet 30 with the shared private key. In various embodiments, admit/reject packet 30 is cryptographically signed by destination node 14.

Thus, embodiments of network with protocol, privacy preserving source attribution and admission control and method are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A device implemented network utilizing a carrier independent packet delivery universal addressing networking protocol, comprising:
 a plurality of network nodes, said networking protocol for communication between said plurality of network nodes utilizing a packet;
 an IP stack having a plurality of layers, at least some of the plurality of layers comprising:
  privacy preserving source node attribution including a serial number and an agent identifier, wherein said agent identifier identifies an agent controlling access to an identity of an entity corresponding to said serial number; and
  network admission control with said packet being admitted to said network only if a source node of said plurality of network nodes admits said packet;
 wherein said source node has an identification address and wherein said packet carries said identification address of said source node; and
 wherein said identification address of said source node is established by a trusted entity.

2. The networking protocol as in claim 1 wherein a destination node has an identification address and wherein said packet carries both said identification address of said source node and said identification address of said destination node.

3. The networking protocol as in claim 2 further comprising a database of trusted identification addresses maintained by said trusted entity and wherein said destination node relies on said database and said identification address of said source node on admission of said packet to said network.

4. A network node configured for communication over a network utilizing a packet from a source node to a destination node, comprising:
 a protocol control having:
  a device implemented, carrier independent packet delivery universal addressing networking protocol having an IP stack, comprising:
  privacy preserving source node attribution running on said IP stack configured to communicate to said destination node, the privacy preserving source node attribution including a serial number and an agent identifier, wherein said agent identifier identifies an agent controlling access to an identity of an entity corresponding to said serial number; and
  network admission control with said packet configured to be admitted to said network only if the source node of said packet allows admission;
 wherein said source node has an identification address and wherein said packet carries said identification address of said originating node; and
 wherein identification address of said source node is established by a trusted entity.

5. The network node as in claim 4 wherein a destination node has an identification address and wherein said packet carries both said identification address of said originating node and said identification address of said destination node.

6. The network node as in claim 5 further comprising a database of trusted identification addresses maintained by said trusted entity and wherein said destination node relies on said database and said identification address of said source node on admission of said packet to said network.

7. A device implemented method for communicating over a network between a plurality of network nodes using a device implemented, carrier independent packet delivery universal addressing network protocol having an IP stack having a plurality of layers, at least some of said plurality of layers comprising a privacy preserving source node attribution and a network admission control, comprising the steps of:
 preserving a privacy of said source node using said privacy preserving source node attribution by including in a packet a serial number and an agent identifier, wherein said agent identifier identifies an agent controlling access to an identity of an entity corresponding to said serial number; and
 admitting said packet onto said network only if said source node admits said packet;
 wherein said source node has an identification address, wherein a destination node has an identification address, and further comprising the step of incorporating both said identification address of said source node and said identification address of said destination node into said packet; and
 wherein said network further comprises a trusted entity, and wherein said identification address of said source node is established by said trusted entity.

8. The method as in claim 7 where said network further comprises a database of trusted identification addresses maintained by said trusted entity, and further comprising the step of admitting said packet to said network relying on using said database and said identification address of said source node.

9. A network system for transmission of data, comprising:
a packet;
a plurality of nodes, said plurality of nodes being at least a source node and a destination node, said network being configured to transmit said packet from said source node to said destination node;
a network protocol comprising a protocol in which source node credentials are presented to said destination node in a packet request and in which said destination node examines said source node credentials to determine whether said source node qualifies for transmission to said destination node and responds with an admit packet or a reject packet; and
a trusted network interface configured to accept or reject said packet at or from said source node for said destination node based upon said admit packet or said reject packet sent by said destination node.

10. The network system as in claim 9 in which said communication between said source node and said destination node further enables said source node and said destination node to agree on a shared private key to encrypt said packet.

11. The network system as in claim 10 in which said trusted network interface utilizes said shared private key to verify an integrity of said packet.

12. The network system as in claim 9 wherein said admit packet and said reject packet is cryptographically signed by said destination node.

13. The network system as in claim 9 wherein said trusted network interface is a component of said source node.

14. The network system as in claim 9 wherein said trusted network interface is physically separate from said source node.

15. The network system as in claim 9 wherein said trusted network interface comprises components located in both of said source node and physically separate from said source node.

16. A method for controlling admission of a packet to a network having a plurality of nodes being at least a source node, a destination node and a trusted network interface, comprising the steps of:
transmitting, by said source node, a packet request comprising source node credentials from said source node to said destination node;
determining, by said destination node, whether said source node qualifies for transmission to said destination node based on said source node credentials in said packet request;
transmitting an accept packet or a reject packet from said destination node to said source node based, at least in part, on said determination; and
controlling admission, by said trusted network interface, of a packet to said network based on said admit packet or said reject packet.

17. The method as in claim 16 wherein said source node and said destination node engage in communication based, at least in part, on the controlling admission step, and further comprising the step of agreeing, between said source node and said destination node, on a shared private key to encrypt said packet based, at least in part, on said communication.

18. The method as in claim 17 further comprising the step of verifying, with said trusted network interface, an integrity of said packet with said shared private key.

19. The method as in claim 17 further comprising the step of cryptographically signing said admit packet and said reject packet by said destination node.

20. The network node of claim 4, wherein said entity corresponding to said serial number is an entity responsible for said source node.

21. The network node of claim 4, wherein said agent controls access to said identity by releasing said identity only with the consent of said entity corresponding to said serial number or if permitted by governing laws.

* * * * *